United States Patent [19]
Brady et al.

[11] Patent Number: 6,022,717
[45] Date of Patent: Feb. 8, 2000

[54] USE OF OXIDATION PROMOTING CHEMICALS IN THE OXIDATION OXIDIZABLE GALACTOSE TYPE OF ALCOHOL CONFIGURATION CONTAINING POLYMER

[75] Inventors: Richard Lee Brady, Wilmington; Raymond Thomas Leibfried, Sr., Newark, both of Del.

[73] Assignee: Hercules Incorporated, Wilmington, Del.

[21] Appl. No.: 09/001,785

[22] Filed: Dec. 31, 1997

[51] Int. Cl.⁷ .............................. C12P 7/24; C12P 19/04
[52] U.S. Cl. ..................... 435/101; 435/27; 435/128; 435/129; 435/135; 435/147; 435/190; 435/192; 435/274; 435/278
[58] Field of Search ..................... 435/147, 190, 435/128, 101, 129, 135, 27, 192, 274, 278

[56] References Cited

U.S. PATENT DOCUMENTS

| | | | |
|---|---|---|---|
| 3,297,604 | 1/1967 | Geromino | 525/54.2 |
| 4,663,448 | 5/1987 | Chiu | 536/111 |
| 5,554,745 | 9/1996 | Chiu et al. | 536/52 |

OTHER PUBLICATIONS

Derwent Abstract WPIL 88–258460/37 EP–281655 "Starch Ether Derivs.–Used in Prepn of Aldehyde–Contg. Hetero:Polysaccharide(s), by Reacting with Galactose Oxidase", Sep. 14, 1988.

*Primary Examiner*—Herbert J. Lilling
*Attorney, Agent, or Firm*—Ivan G. Szanto; Robert P. O'Flynn O'Brien

[57] ABSTRACT

Process for the oxidation of the oxidizable galactose type of alcohol in oxidizable galactose type of alcohol configuration containing polymer, such as guar, with galactose oxidase in the presence of oxidation promoting chemicals.

19 Claims, No Drawings

USE OF OXIDATION PROMOTING CHEMICALS IN THE OXIDATION OXIDIZABLE GALACTOSE TYPE OF ALCOHOL CONFIGURATION CONTAINING POLYMER

BACKGROUND OF THE INVENTION

1. Field of the Invention

The present invention relates to the oxidation of oxidizable galactose type of alcohol configuration containing polymer and more particularly it relates to the use of oxidation promoting chemicals in such oxidation by galactose oxidase.

2. Description of the Prior Art

The product of the oxidation of aqueous solutions of guar gum and other galactose bearing polysaccharides using galactose oxidase enzyme was disclosed by F. J. Germino in U.S. Pat. No. 3,297,604. The aldehyde bearing oxidized products are separated by precipitation from the aqueous solutions used for the enzyme reactions. Germino disclosed the use of the oxidized products in the manufacture of paper. The aldehyde bearing oxidized products were disclosed to be also suitable for use to crosslink polyamino polymers, polyhdroxy polymers, and proteins.

C. W. Chiu, et.al., U.S. Pat. No. 5,554,745, discloses (1) the preparation of cationic galactose containing polysaccharides and (2) the enzymatic oxidation in aqueous solution of the cationic galactose containing polysaccharides with galactose oxidase. The oxidized cationic polysaccharides are disclosed to improve the strength characteristics of paper.

SUMMARY OF THE INVENTION

According to the present invention there is provided a process for the oxidation of the oxidizable galactose type of alcohol configuration to aldehyde in oxidizable galactose type of alcohol configuration containing polymers comprising providing oxidizable galactose type of alcohol configuration containing polymer and galactose oxidase and oxidation promoting chemical and contacting them.

DETAILED DESCRIPTION OF THE INVENTION

It has surprisingly been discovered that the use of oxidation promoting chemicals, e.g., 1,2-benzisothiazolin-3-one, in the oxidation of oxidizable galactose type of alcohol configuration containing polymers, e.g., guar, by galactose oxidase, results in increased levels of oxidation and corresponding increase in paper strength characteristics when the oxidized galactose type of alcohol configuration containing polymer is employed in the papermaking process.

Generally the oxidation promoting chemical can be organic carboxylate compound, organic heterocyclic compound, and/or quaternary amine compound. Preferably the organic carboxylate compound is sorbic acid, salicylic acid, benzoic acid, toluic acid, phthalic acid and their corresponding salts, the organic heterocyclic compound is 1,2-benzisothiazoline-3-one, and/or 2-methyl-4-isothiazoline-3 -one, and the quaternary amine compound is cetyltrimethylammonium bromide and/or epoxy quaternary amines. Most preferably the oxidation promoting chemical is 1,2-benzisothiazoline-3-one.

The oxidizable galactose alcohol type of configuration can be described by the following chemical structures:

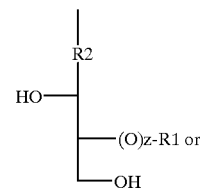

I

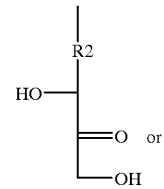

II

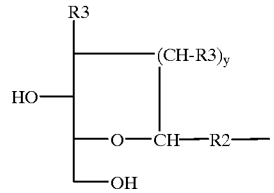

III where;
R1=an alkyl group of the formula C(n)H(2n+1) where n=0–20;
z=0,1;
R2=a linking group composed of an alkylene, or an aromatic alkylene, or an alkylene ether, or an alkylene ester, or an alkylene amide, or an alkylene urethane diradical. Such linking groups have a total number of carbon from 2 to 20;
R3= —H, —OH, —OCH3, —OC2H5, —OC3H7, —OC4H9, —OOCR5 (where R5=alkyl radical of 1 to 5 carbons), —NH2, —NH—CO—R5;
and y=0,1.

The oxidizable galactose type of alcohol configuration containing polymers can be galactomannan gums or their ether derivatives, arabinogalactan gums or their ether derivatives, other gums or their ether derivatives, galactoglucomannan hemicelluloses or their ether derivatives and synthetically or enzymatically modified polymers. Preferred galactomannan gums are guar, locust bean, tara and fenugreek. Preferred arabinogalactan gums are arabic, larch and tragacanth gums. Preferred synthetically of enzymatically modified polymers are galactose deficient polysaccharides, polyacrylamides, polyacrylates, polyamides, polyvinyl alcohol, and polyvinyl acetate. Most preferred such polymers are starch and polyacrylates. The phrase "galactose deficient" as used in the present application means that the oxidizable galactose type of alcohol configuration containing polymer it refers to contains less than 20% of oxidizable galactose type alcohol configuration based on the weight of the oxidizable galactose type of alcohol configuration containing polymer. Preferred other gums are carubin, lichenan, tamarind and potato galactan. Most preferred oxidizable galactose type of alcohol configuration containing polymers are guar gum and its ether derivatives such as cationic anionic, amphoteric, hydroxypropyl, dihydroxypropyl and hydroxyethyl guar.

Synthetically or enzymatically modified polymers can be obtained by attaching the oxidizable galactose type of alcohol configuration to polymers or by polymerizing a monomer that contains oxidizable galactose type of alcohol configuration.

The oxidized galactose type of alcohol configuration containing polymer component of the present invention has at least about 5 mole % of its oxidizable galactose type of alcohol configuration oxidized to aldehyde. Preferably, at least about 25 mole % and most preferably at least about 50 mole % of such alcohol has been oxidized to aldehyde. The oxidizable galactose type of alcohol configuration containing polymer used for oxidation can range over a wide molecular weight range. It can be high molecular weight, or alternatively it can be a depolymerized (reduced viscosity) polymer. Generally, the lower limit of the weight average molecular weight of the oxidizable gallactose type of alcohol configuration containing polymer can be about 5,000. The upper limit of the weight average molecular weight of the oxidizable galactose type of alcohol configuration containing polymer can be about 5,000,000. Preferably, the molecular weight range as indicated by room temperature Brookfield viscosity is at least about 15 cps at 2 weight percent solution in water, most preferably, at least about 100 cps at 1 weight percent solution in water. Preferably, the room temperature Brookfield viscosity can be up to about 10,000 cps most preferably up to about 6,000 cps at 1 weight percent solution in water,. (Measured in Brookfield LVT viscometer with small sample adapter, 25° C., spindle 31, speed 3 rpm).

Guar is preferred as the oxidizable galactose type of alcohol configuration containing polymer for use in the present invention. The present application refers to guar specifically in certain instances, however, the person of ordinary skill in art will recognize that these teachings apply to the oxidizable galactose type of alcohol configuration containing polymer in general.

Galactose oxidase (EC 1.1.3.9) is a copper oxidase which converts the oxidizable galactose type of alcohol configuration to the corresponding aldehyde group (thus producing oxidized galactose) by reducing oxygen to hydrogen peroxide. The copper must be in the correct oxidation state ($Cu^{2+}$) to perform this oxidation and the copper ion must be retained in the galactose oxidase. If the galactose oxidase solution is stored anaerobically with any oxidizable substrate, it can become inactive. Galactose oxidase can be reactivated by oxidizing the copper with reagents such as potassium ferricyanide. Another way to oxidize the copper in galactose oxidase would be by electrochemical oxidation.

Galactose oxidase can be obtained by any suitable manner, e.g., by fermenting various wild type and cloned fungi but is usually obtained from Fusarium spp (NRRL 2903). Cultures may also be obtained from the American Type Culture Collection under Dactylium dendroides ATCC 46032 and they are successfully fermented under the procedure of Tressel and Kosman. Methods in Enzymology, Vol 89 (1982), pg 163–172. The gene for active forms of the enzyme have been expressed in E. coli and Aspergillus and this development may lead to more stable and active forms of the enzyme as well as much greater production levels. The gene or improved forms will also be expressed in plants which can be harvested to give higher levels of enzyme without the threat of enzyme destruction by proteases in a fermentation broth.

The enzyme can also be expressed by other organisms including: Gibberella fujikoroi, Fusarium graminearum, and Bettraniella porticensis.

The treatment of oxidizable galactose type of alcohol configuration containing polymer with galactose oxidase and catalase is the subject of companion application Ser. No. 09/801,789 filed on Dec. 31, 1997 (Hercules Docket No. PCH 5484, "Oxidation in Solid State of Oxidizable Galactose Type of Alcohol Configuration Containing Polymers" by R. L. Brady, R. T. Leibfried and T. T. Nguyen), the disclosure of which is hereby incorporated by reference.

Preferably the oxidation of oxidizable galactose type of alcohol configuration containing polymer with galactose oxidase is carried out in the presence of means to decompose the hydrogen peroxide generated during the conversion of the oxidizable galactose type of alcohol configuration to aldehyde. Preferably the means to decompose hydrogen peroxide is catalase.

Other metal complexes and compounds can also be used to decompose the hydrogen peroxide formed in the oxidation reaction. Chemicals that will accomplish redox chemistry with hydrogen peroxide are iron complexes, e.g., with polyamines (notably triethylenetetramine) and persulfates.

The oxidizable galactose type of alcohol configuration containing polymer can be oxidized in solid form, in slurry form or in solution. The oxidation can be carried out enzymatically by galactose oxidase. Preferably neutral, cationic or anionic or amphoteric guar that has been oxidized by galactose oxidase and catalase is used in the present invention. Galactose oxidase can be applied to solid, slurry, or solution forms of guar products: e.g., shredded, powder, flake, and pellet forms of neutral, cationic, anionic or amphoteric guar. Guar derivatives, such as those containing hydroxypropyl groups can also be used.

The lower limit of the oxidation promoting chemical can be about 0.1% based on the weight of oxidizable galactose type of alcohol configuration containing polymer. Preferably the lower limit of the oxidation promoting chemical is 0.5% and most preferably it is 1%. The upper limit of the oxidation promoting chemical can be about 5% based on the weight of oxidizable galactose type of alcohol configuration containing polymer, preferably about 3% and most preferably about 2%.

When the oxidizable galactose type of alcohol configuration containing polymer is contacted with galactose oxidase in aqueous medium the lower limit of the oxidizable galactose type of alcohol configuration containing polymer can be about 0.001%, preferably about 0.2% and most preferably about 8%. In this instance the upper limit of the oxidizable galactose type of alcohol configuration containing polymer can be about 50%, preferably about 30% and most preferably about 20%, all based upon the weight of the composition.

When solid oxidizable galactose type of alcohol configuration containing polymer is contacted with solid galactose oxidase, the lower limit of the oxidizable galactose type of alcohol configuration can be about 50% based upon the weight of the composition. Preferably the lower limit is about 70% and most preferably it is about 85%. When solid oxidizable galactose type of alcohol configuration containing polymer is contacted with solid galactose oxidase the upper limit of the oxidizable galactose type of alcohol configuration containing polymer can be about 100% based upon the weight of the composition. Preferably it can be about 98% and most preferably about 95%.

An International Unit (IU) of galactose oxidase will convert one microequivalent of the oxidizable galactose type of alcohol configuration containing polymer to aldehyde per minute at 25° C. and pH 7.0. The unit can be measured by coupled assays where the by-product $H_2O_2$ is used by peroxidases to oxidize dye precursors, giving a chromophore. The production of the chromophore is measured by light absorbance at a wavelength suitable to the dye used (o-tolidine, 425 nm; o-dianisidine, 436 nm; $2,2^1$-azinobis(3-ethylbenzo-thiazoline-6-sulfonic acid), diammonium salt (ABTS), 405 nm). The method using the ABTS dye is used to determine International Units (IU).

The lower limit of the galactose oxidase can be about 10 IU per gram of oxidizable galactose type of alcohol configuration containing polymer. Preferably the lower limit is about 25 and most preferably about 35 IU per gram of oxidizable galactose type of alcohol configuration containing polymer. The upper limit of the galactose oxidase can be about 3,000 IU per gram of oxidizable galactose type of alcohol configuration containing polymer, preferably about 2,000 and most preferably about 1,000 IU per gram of oxidizable galactose type of alcohol configuration containing polymer.

The lower limit of catalase can be about 1, preferably about 50 and most preferably about 100 IU of catalase/IU of galactose oxidase. The upper limit of catalase can be about 10,000, preferably about 5,000 and most preferably about 1,000 IU of calatase/IU of galactose oxidase. One (1) IU of catalase will convert a micromole ($10^{-6}$ mole) of hydrogen peroxide to water and oxygen per minute at pH 7.0 and 25° C.

In the examples, handsheets were made on a Noble and Wood Sheet Machine (Noble and Wood Machine Co., Hoosick Falls, N.Y.) using standard hard water at a controlled pH of 7.5. Standard hard water (50 ppm alkalinity and 100 ppm hardness) was made by mixing deionized water with $CaCl_2$ and $NaHCO_3$. Control of pH was achieved by using NaOH or $H_2SO4$. Bleached kraft pulp was beaten to a Canadian Standard Freeness of 455 at a consistency of 2.5 weight %. The beaten pulp was added to the proportioner at a controlled level (depending on final desired basis weight) and diluted to 18 liters with standard hard water. For 80 lb/3000 ft$^2$ basis weight, 4000 ml of pulp mixture was used. Chemical additions and pH adjustments were made to the proportioner as desired, and with continuous mixing.

A clean and wetted 100 mesh screen was placed on the open deckle box, which was then closed. Standard hard water and 920 ml of pulp mixture from the proportioner were then added to the deckle box, and dashed. The water was then drained from the box, and the sheet removed. The sheet was wet pressed between felts with press weights adjusted to give a solids content of 33–34%. The sheet and screen were then placed on a drum dryer, which was adjusted to a temperature of 228–232° F. and throughput time of 50–100 sec, depending on basis weight. Final sheet moisture contents were 3–5%. Five sheets minimum were tested for each experimental set.

Tensile testing was done on the handsheets according to TAPPI Method T 494 om-88 ("TAPPI Test Methods". TAPPI Press, Atlanta, Ga. 1996).

Aldehyde content was measured by iodometric titration or DNS method. The iodometric assay for aldehyde ($I_2$+ CHO→COOH+2I$^-$) uses titration of excess $I_2$ with sodium thiosulfate. The DNS method utilizes 3,5-dinitrosalicylic acid to oxidize the aldehyde followed by colorimetric titration as described by Ghose in *Pure & Application Chem.*, 59, pg 257 (1987).

Viscosity was measured with an LVT Brookfield Viscometer equipped with a constant temperature bath (25° C.), small sample adapter, spindle 31 and speed 3 rpm.

The scope of this invention as claimed is not limited by the following examples, which are given merely by way of illustration. All parts and percentages are by weight unless otherwise indicated.

EXAMPLE 1

This example shows the effect of various oxidation promoting chemicals on the oxidation of shredded guar. Shredded guar was oxidized at 0.2% in deionized water by adding 1% of various oxidation promoting chemicals, 540 IU of galactose oxidase (Sigma G7400)/g of guar and 1852 IU of catalase (Sigma C40)/IU of galactose oxidase. The resulting solutions were stirred for 3 days at room temperature. Table 1 shows the oxidase promoting chemicals and the results of the iodometric titration for aldehyde at the end of 3 days. Theoretical full reaction would give 2.06 meq/g for the aldehyde. All the oxidation promoting chemicals aid the oxidation so that a higher level of aldehyde content is obtained.

TABLE I

| Oxidation of guar with oxidation promoting chemical | |
| --- | --- |
| Oxidation Promoting Chemical (1% of guar) | Aldehyde (meq/g) |
| None | 0.80 |
| Sodium Benzoate | 0.84 |
| Sorbic Acid | 0.94 |
| Salicylic Acid | 1.11 |
| 1,2-benzisothiazolin-3-one (Proxel GXL)* | 1.26 |

*availabie from Zeneca, Wilmington, Delaware

EXAMPLE 2

This example shows the effect of higher levels of Proxel GXL on the oxidation of guar. To a 0.2% aqueous solution of Supercol U neutral guar powder was added 1% or 10% (based on guar) of 1,2-benzisothiazolin-3-one. Catalase (Sigma C40) was added at 1852 IU/IU of galactose oxidase. Galactose oxidase was added at 108 IU/g of guar.

The solutions were stirred for 2 days, after which the solutions were analyzed for aldehyde content. Table II shows the % conversion to aldehyde, as measured by the DNS method. The use of 10% of Proxel GXL resulted in a large improvement in the aldehyde conversion.

TABLE II

| Oxidation of Supercol U neutral guar with Proxel GXL | |
| --- | --- |
| Active Amount of proxel GXL | Aldehyde Conversion (%) |
| 0% | 17.8 |
| 1% | 16.4 |
| 10% | 40.5 |

EXAMPLE 3

This example shows the improvement in paper strength that can be attained by using an oxidation promoting chemical in the oxidation process. Neutral shredded guar was used at 0.2% in water. Proxel GXL was added as indicated to give a level of 1,2-benzisothiazolin-3-one of 1% based on the guar. Catalase (Sigma C40) at 1852 IU/IU of galactose oxidase (Sigma G7400) at 540 IU/g guar were added to the solutions. Samples were mixed overnight before titration and papermaking. Handsheets were made at 80 lb/3000 ft$^2$ basis with bleached kraft pulp and an oxidized guar level of 1% based on dry weight of the pulp. Table III shows the results for aldehyde level (iodometric titration) and paper dry tensile strength for oxidized guar with and without Proxel GXL. Using Proxel GXL resulted in a much higher oxidation level and greatly improved paper properties.

TABLE III

Effect of Proxel GXL on Aldehyde Level and Dry Strength.

| Additive to Pulp | Aldehyde Level of Oxidized Guar (meq/g) | Paper Dry Strength |
| --- | --- | --- |
| None | — | 37.15 |
| Oxidized Neutral Guar, no Proxel GXL | 0.82 | 40.45 |
| Oxidized Neutral Guar, 1% Active Proxel GXL | 2.09 | 54.96 |

We claim:

1. A process for the oxidation of an oxidizable galactose type of alcohol configuration to aldehyde in an oxidizable galactose type of alcohol configuration containing polymer comprising providing the oxidizable galactose type of alcohol configuration containing polymer and galactose oxidase and oxidation promoting chemical and contacting them, wherein the oxidizable galactose alcohol type of configuration is described by the following chemical structures

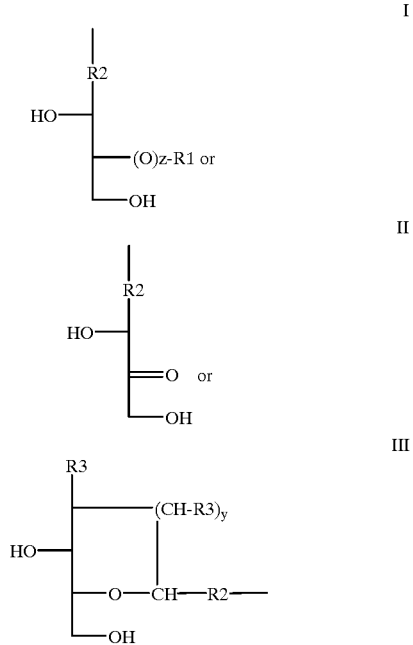

where, R1 is an alkyl group of the formula C(n)H(2n+1) where n is 0 to 20; z is 0 or 1; where R2 is a linking group composed of an alkylene, or an aromatic alkylene, or an alkylene ether, or an alkylene ester, or an alkylene amide, or an alkylene urethane diradical where said linking groups has a total number of carbon from 2 to 20; where R3 is —H, —OH, —OCH$_3$, —OC$_2$H$_5$, —OC$_3$H$_7$, —OOCR5, (where R5 is alkyl radical of 1 to 5 carbons), —NH$_2$, —NH—CO—R5; and y is 0 or 1; and wherein the oxidizable galactose type of alcohol configuration containing polymer is selected from the group consisting of galactomannan gums or their ether derivatives, arabinogalactan gums or their ether derivatives, other gums or their ether derivatives, galactoglucomannan hemicelluloses or their ether derivatives and galactose deficient polysaccharides, polyacrylamides, polyacrylates, polyamides, polyvinyl alcohol, and polyvinyl acetate.

2. The process of claim 1 wherein the oxidation promoting chemical is selected from the group consisting of organic carboxylate compounds, organic heterocyclic compounds and quaternary amine compounds.

3. The process of claim 1 wherein the oxidizable galactose type of alcohol configuration containing polymer is in solution.

4. The process of claim 1 wherein the lower limit of oxidizable galactose type of alcohol configuration containing polymer is about 0.001% based on the total weight of oxidizable galactose type of alcohol configuration containing polymers, galactose oxidase and oxidation promoting chemical and the lower limit of galactose oxidase is about 10 IU/g of oxidizable galactose type of alcohol configuration containing polymers and the lower limit of oxidation promoting chemical is about 0.1% based on the total weight of oxidizable galactose type of alcohol configuration containing polymers, galactose oxidase and oxidation promoting chemical.

5. The process of claim 1 wherein the upper limit of oxidizable galactose type of alcohol configuration containing polymer is about 99% based on the total weight of oxidizable galactose type of alcohol configuration containing polymer, galactose oxidase and oxidation promoting chemical, the upper limit of galactose oxidase is about 3,000 IU/g of oxidizable galactose type of alcohol configuration containing polymer and the upper limit of oxidation promoting chemical is about 5% based on the total weight of oxidizable galactose type of alcohol configuration containing polymer, galactose oxidase and oxidation promoting chemical.

6. The process of claim 1 comprising the addition of means that can decompose hydrogen peroxide, wherein the oxidation of the oxidizable galactose type of alcohol configuration to aldehyde in the oxidizable galactose type of alcohol configuration containing polymer is carried out in the presence of the means that can decompose hydrogen peroxide.

7. The process of claim 6 wherein the means to decompose hydrogen peroxide is selected from the group consisting of catalase, iron complexes and persulfrates.

8. The process of claim 6 wherein the means to decompose hydrogen peroxide is catalase in an amount of at least about 1 IU of catalase per unit of galactose oxidase.

9. The process of claim 6 wherein the means to decompose hydrogen peroxide is catalase in an amount of up to about 10,000 IU of catalase per unit of galactose oxidase.

10. The process of claim 2 wherein the oxidizable galactose type of alcohol configuration containing polymer is selected from the group consisting of galactomannan gums or their ether derivatives, arabinogalactan gums or their ether derivatives, other gums or their ether derivatives, galactoglucomannan hemicelluloses or their ether derivates and synthetically or enzymatically modified polymer, the lower limit of oxidizable galactose type of alcohol configuration containing polymer is about 0.001% based on the total weight of oxidizable galactose type of alcohol configuration containing polymer, galactose oxidase and oxidation promoting chemical, the lower limit of galactose oxidase is about 10 IU/g of oxidizable galactose type of alcohol configuration containing polymer and the lower limit of oxidation promoting chemical is about 0.1% based on the total weight of oxidizable galactose type of alcohol configuration containing polymer, galactose oxidase and oxidation promoting chemical, the upper limit of oxidizable galactose type of alcohol configuration containing polymer is about 99% based on the total weight of oxidizable galactose type of alcohol configuration containing polymer, galactose oxidase and oxidation promoting chemical, the upper limit of galactose oxidase is about 3,000 IU/g of oxidizable galactose type of alcohol configuration containing polymer and the upper limit of oxidation promoting chemical is about 5% based on the total weight of oxidizable galactose type of alcohol configuration containing polymer, galactose oxidase and oxidation promoting chemical, means to decompose hydrogen peroxide is added and the means to decompose hydrogen peroxide is catalase in an amount of at least about 1 IU per IU of galactose oxidase and up to about 10,000 IU per unit of galactose oxidase.

11. The process of claim 10 wherein the organic carboxylate compound is selected from the group consisting of sorbic acid, salicylic acid, benzoic acid, toluic acid, phthalic acid and their corresponding salts, the organic heterocyclic compound is selected from the group consisting of 1,2-benzisothiazolin-3-one and 2-methyl-4-isothiazolin-3-one and the quaternary amine compound is selected from the group consisting of cetyltrimethylammonium bromide and epoxy quaternary amines.

12. The process of claim 10 wherein the galactomannan gum is selected from the group consisting of guar, locust bean, tara and fenugreek gum or their ether derivatives; the arabinogalactan gum is selected from the group consisting of arabic, larch and tragacanth gum or their ether derivatives, the other gum is selected from the group consisting of carubin, lichenan and potato galactan gum or their ether derivatives and the synthetically or enzymatically modified polymer is selected from the group consisting of galactose deficient polysaccharides, polyacrylates, polyacrylamides, polyvinyl alcohol and polyvinyl acetate.

13. The process of claim 10 wherein the lower limit of oxidizable galactose type of alcohol configuration containing polymer is about 0.2% based on the total weight of oxidizable galactose type of alcohol configuration containing polymer, galactose oxidase and oxidation promoting chemical, the lower limit of galactose oxidase is about 25 IU/g of oxidizable galactose type of alcohol configuration containing polymer, the lower limit of oxidation promoting chemical is about 0.5% based on the total weight of oxidizable galactose type of alcohol configuration containing polymer, galactose oxidase and oxidation promoting chemical and the lower limit of catalase is about 50 IU per unit of galactose oxidase.

14. The process of claim 10 wherein the upper limit of oxidizable galactose type of alcohol configuration containing polymer is about 98% based on the total weight of oxidizable galactose type of alcohol configuration containing polymer, galactose oxidase and oxidation promoting chemical, the upper limit of galactose oxidase is about 2,000 IU/g of oxidizable galactose type of alcohol configuration containing polymer, the upper limit of oxidation promoting chemical is about 3% based on the total weight of oxidizable galactose type of alcohol configuration containing polymer, galactose oxidase and oxidation promoting chemical and the upper limit of catalase is about 5,000 IU per IU of galactose oxidase.

15. The process of claim 10 wherein the oxidation promoting chemical is 1,2-benzisothiazolin-3-one.

16. The process of claim 10 wherein the oxidizable galactose type of alcohol configuration containing polymer is selected from the group consisting of guar gum and its ether derivatives.

17. The process of claim 10 wherein the lower limit of oxidizable galactose type of alcohol configuration containing polymer is about 8% based on the total weight of oxidizable galactose type of alcohol configuration containing polymer, galactose oxidase and oxidation promoting chemical, the lower limit of galactose oxidase is about 35 IU/g of oxidizable galactose type of alcohol configuration containing polymer, and the lower limit of oxidation promoting chemical is about 1% based on the total weight of guar, galactose oxidase and oxidation promoting chemical and the lower limit of catalase is about 100 IU per IU of galactose oxidase.

18. The process of claim 10 wherein the upper limit of oxidizable galactose type of alcohol configuration containing polymer is about 95% based on the total weight of oxidizable galactose type of alcohol configuration containing polymer, galactose oxidase and oxidation promoting chemical, the upper limit of galactose oxidase is about 1000 IU/g of oxidizable galactose type of alcohol configuration containing polymer, the upper limit of oxidation promoting chemical is about 2% based on the total weight of oxidizable galactose type of alcohol configuration containing polymer, galactose oxidase and oxidation promoting chemical and the upper limit of catalase is about 1,000 IU per IU of galactose oxidase.

19. The process of claim 1 wherein the oxidizable galactose type of alcohol configuration containing polymer is in solid state.

* * * * *